(No Model.) 5 Sheets—Sheet 1.

J. PFEIFER.
CASH REGISTER AND RECORDER.

No. 579,604. Patented Mar. 30, 1897.

Fig. 1

Witnesses
G. M. Gridley
Chas. J. Welch

Inventor
John Pfeifer
By his Attorney

(No Model.) 5 Sheets—Sheet 2.

J. PFEIFER.
CASH REGISTER AND RECORDER.

No. 579,604. Patented Mar. 30, 1897.

Witnesses
G. M. Gridley
Chas. I. Welsh

Inventor
John Pfeifer
By his Attorney (No Model.) 5 Sheets—Sheet 4.

J. PFEIFER.
CASH REGISTER AND RECORDER.

No. 579,604. Patented Mar. 30, 1897.

Witnesses
G. M. Gridley
Chas. I. Welch

Inventor
John Pfeifer
By his Attorney

(No Model.) 5 Sheets—Sheet 5.

J. PFEIFER.
CASH REGISTER AND RECORDER.

No. 579,604. Patented Mar. 30, 1897.

Witnesses
G. M. Gridley
Chas. J. Welch

Inventor
John Pfeifer
By his Attorney

UNITED STATES PATENT OFFICE.

JOHN PFEIFER, OF SPRINGFIELD, OHIO, ASSIGNOR OF ONE-HALF TO WILLIAM F. BAUROTH AND EMIL BAUROTH, OF SAME PLACE.

CASH REGISTER AND RECORDER.

SPECIFICATION forming part of Letters Patent No. 579,604, dated March 30, 1897.

Application filed February 21, 1896. Serial No. 580,281. (No model.)

*To all whom it may concern:*

Be it known that I, JOHN PFEIFER, a citizen of the United States, residing at Springfield, in the county of Clark and State of Ohio, have invented certain new and useful Improvements in Cash Registers and Indicators, of which the following is a specification.

My invention relates to improvements in cash registers and indicators; and the invention consists in the constructions and combinations of parts hereinafter described, and set forth in the claims.

In the accompanying drawings, Fig. 6 is a detail showing a part of the adding and indicating devices in front elevation, some of the parts being broken away to more clearly illustrate the operation thereof. Figs. 6$^a$, 7, and 8$^a$ are detail views of a registering and counting device operated by special keys and independent of the regular operation for cash transactions. Fig. 8 is a side elevation of the operating-lever and some of the parts connected thereto. Fig. 12 is a detail view of the operating devices for the drawer-lock.

Like parts are represented by similar letters and numerals of reference in the different views.

In the said drawings, $a$ represents the outer casing of the device, which may be of any desired shape and of any suitable construction to retain and support the operating parts.

$a'$ is the cash-receptacle, which is preferably formed in the nature of a drawer and provided with the usual spring $a^2$ for opening the same when released. The drawer is normally held in position by a locking-bolt $a^3$, having a spring $a^4$, which normally depresses the same to cause it to engage the cash-receptacle when the same is closed.

Within the casing $a$ there is preferably a frame which supports the operating parts. This frame consists, essentially, of side supports or frame-pieces $a^5$, which are supported in the casing in any suitable manner, and which are connected together by rods or shafts 1, 2, 3, and 4, which extend from one side of the frame to the other and are either supported rigidly or adapted to turn in suitable bearings in the side frame-pieces $a^5$.

Figures 2, 3, 4, 5:
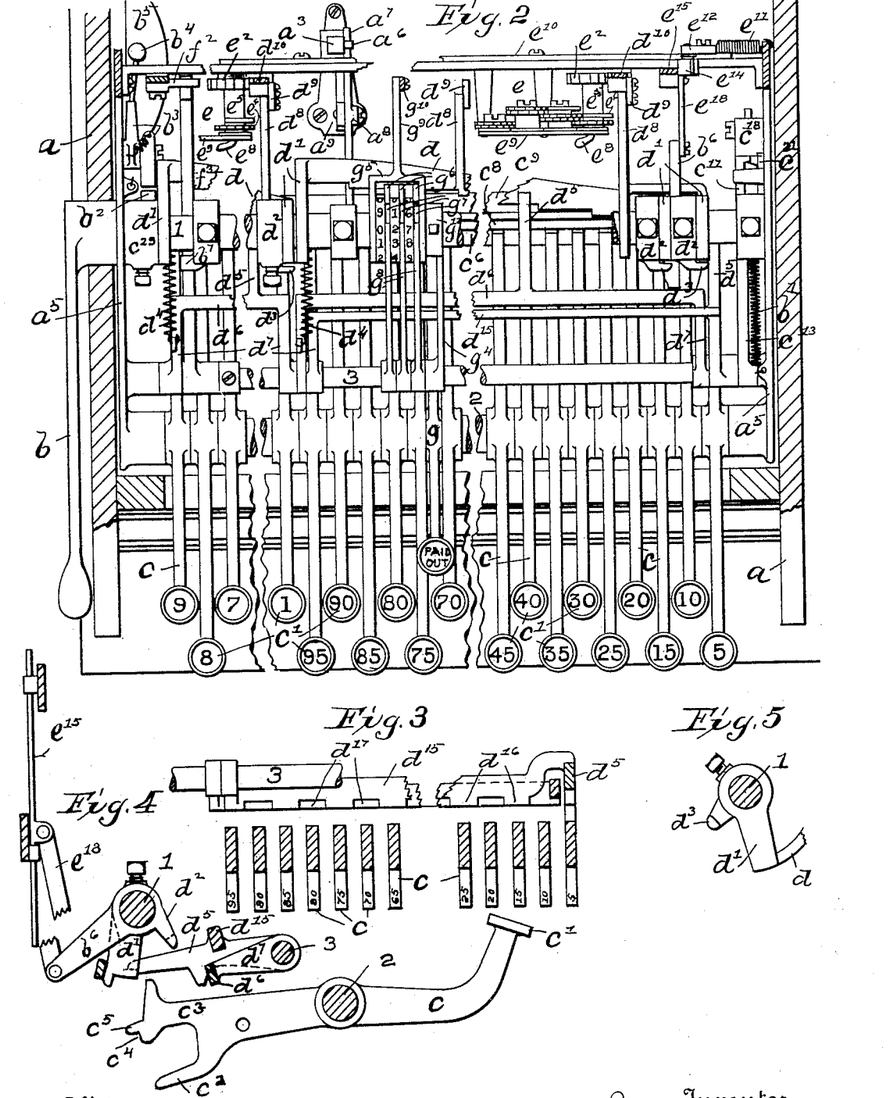
Fig. 2 is a sectional view of the device, the section being taken so that the principal part of the operating mechanism is shown in plan, the upper part of the casing with the indicating-wheels being removed.
Fig. 3 is a sectional view of the key-levers and some of the operating parts in detail, the section being taken transversely through the keys.
Fig. 4 is a sectional view in detail also of the key mechanism, the section being taken in a plane parallel to the plane of the keys.
Fig. 5 is a detail, partly in section, of a graduated bar and devices for operating the same.
Figures 9, 10, 11:
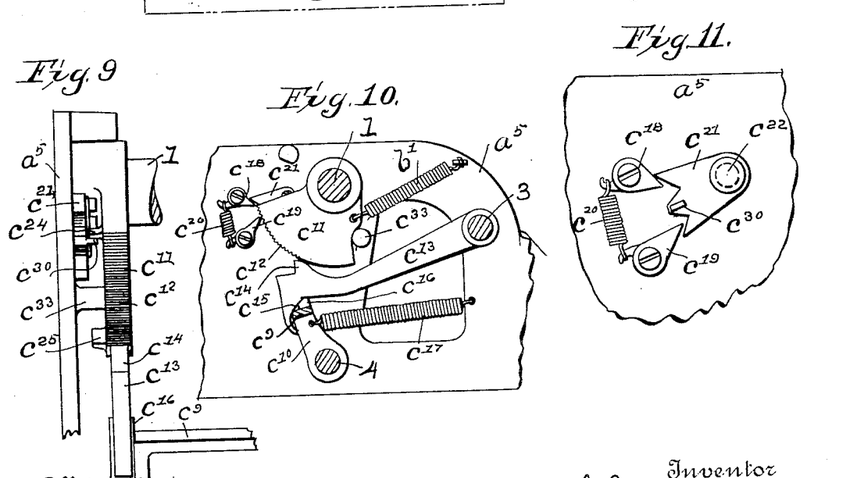
Figs. 9, 10, 11, and 11$^a$ are detail views of the arresting and locking devices connected with the operation of the registering mechanism to secure the complete movements of said parts after the same have been set into operation.
Figure 13:
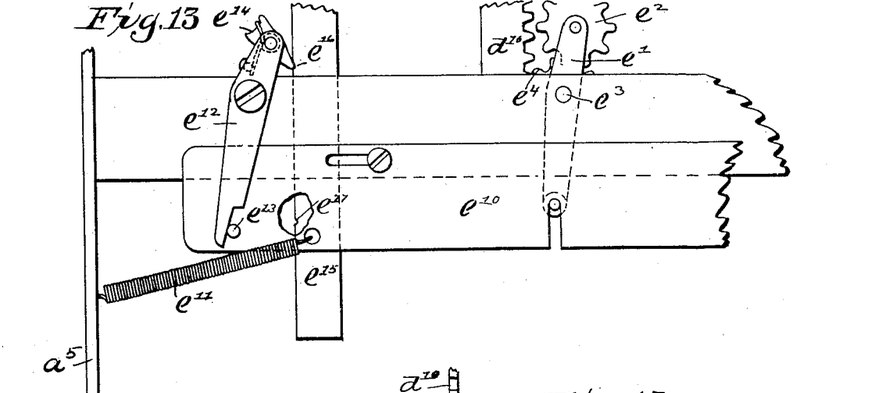
Figs. 13, 14, 15, and 16 are detail views of parts of the registering devices and means for throwing them into and out of position for registering amounts indicated by the indicating-wheels.
Figure 14:
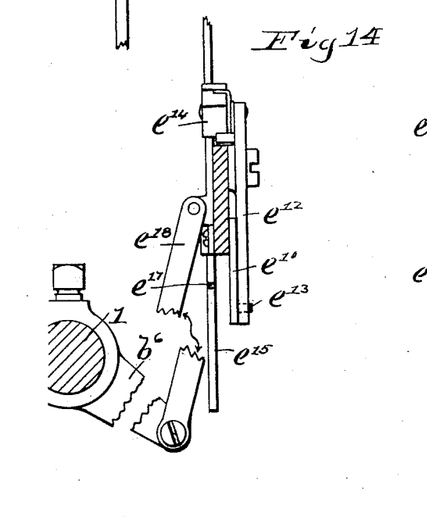

The shaft 1 is journaled in bearings and is adapted to rotate, and this may be termed the "main" shaft. This shaft extends at one end through the casing and is provided with a lever or handle $b$ on the end thereof and on the outside of the casing. This lever is adapted to move through the arc of a circle in the neighborhood of forty degrees in length and return to its normal position, the return movement being effected by a spring $b'$, connected at one end to the frame and at the other to a suitable arm or other projection attached to the shaft, as shown at the right of Fig. 2 and in Fig. 10. The oscillating movement of this lever and its attached shaft produces all the operations connected with the indicating and registering of the amounts or transactions by the devices, except setting the devices to the proper position to be actuated, which is accomplished by depressing the keys; and to this end the first manipulation which takes place is to depress the lever, as means are connected with this lever or shaft which keep the key-levers normally locked. No key can be depressed or any movement of any of the operating parts can be effected until the lever $b$ is depressed or operated to partially rotate the main shaft 1.

The key-levers $c$ are all journaled or pivoted on the shaft or rod 2, which is preferably a stationary rod, each of the keys being provided with a suitable opening to form a bearing. These key-levers $c$ may be at their forward ends of any suitable conformation which will cause them to stand in one or more rows for convenience in manipulation. They are provided with the usual numbered disks or finger-tips $c'$. The inner ends of these levers are bifurcated, so as to form two prongs $c^2$ and $c^3$. The upper prong $c^3$ is preferably notched, as shown at $c^4$, to form a beveled projection $c^5$. These key-levers are preferably arranged in banks, representing different denominations in currency or other transactions to be registered, and in the present machine each bank of keys operates on a separate adding device, thus making what is known as a "detail" adder. In the present machine I have illustrated the use of three banks representing, respectively, units, tens, and hundreds, "5" being indicated as the unit.

Arranged in the rear of each bank of keys there is a swinging locking-plate $c^6$, supported at each end by arms $c^7$, which are journaled on the rod or shaft 4 on which they are adapted to turn. This locking-plate $c^6$ is preferably L-shaped in cross-section, and has a projection $c^8$, which normally engages over the projection $c^5$ of each key in the bank, the lower portion of the plate being under the keys, so that all the keys in said bank are held in a rigid position against movement so long as said locking-plate is in its normal position.

Immediately in the rear of the locking-plate $c^6$ is a swinging bar $c^9$, having arms $c^{10}$, which are also journaled on the rod or shaft 4, the bar $c^9$ being of a sufficient length to extend entirely across all the banks of keys, so as to engage the locking-plate $c^6$ of each bank. When in the normal position, the bar $c^9$ is locked against movement, so that all the keys are locked, and this result is accomplished through the following instrumentalities: There is secured to the main shaft 1, near one of the side frame-pieces $a^5$, a quadrant-shaped disk $c^{11}$, (see Figs. 9 and 10 for detail,) and it is preferably to this disk that the spring $b'$ is attached to return the shaft and its operating-lever to its normal position. This disk is provided on a portion of its periphery with small teeth or serrations $c^{12}$, the remaining portion of the periphery being plain. In its normal position the disk rests against a lug or projection $c^{33}$ on the frame, being held in this position by the spring $b'$. There is pivoted on the shaft 3, near the side frame, a lever $c^{13}$, which is curved at its free end and has a projection $c^{14}$, which rests against the plain surface of the quadrant-shaped disk $c^{11}$. The opposite side of this lever $c^{13}$ is provided with a beveled cam-face $c^{15}$, which rests in contact with a similarly-shaped projection $c^{16}$ on the end of the locking-bar $c^9$. The locking-bar $c^9$ is held in contact with the locking-plate $c^6$, and these are returned to their normal positions by a spring $c^{17}$, connected to one of the arms $c^{10}$, which supports the locking-bar, and to a suitable part of the frame. By this construction the end of the swinging arm or lever $c^{13}$ stands between the projection $c^{16}$ and the disk $c^{11}$, and the locking-bar $c^9$ cannot be moved backwardly as long as the disk is in this position.

There are pivoted to the side frame adjacent to the serrated periphery of the disk two pawls $c^{18}$ and $c^{19}$, connected together by a spring $c^{20}$, which spring tends to throw the pawls against the periphery of the disk so as to engage the teeth thereof from opposite directions. Behind the disk $c^{11}$ and also pivoted to the frame is a reversing-pawl $c^{21}$, journaled on a stud $c^{22}$, which has thereon a spring $c^{23}$, which bears on the pawl $c^{21}$ and tends to hold it by friction in either position which it may assume in operation, as will appear hereinafter. This reversing-pawl $c^{21}$ has a projection $c^{30}$, which is adapted to be engaged on opposite sides by projections $c^{24}$ $c^{25}$ on the disk $c^{11}$.

Now as the main shaft 1 is turned by the lever $b$ the serrated portion of the quadrant-shaped disk $c^{11}$ is engaged by the pawl $c^{19}$, which prevents the return movement of said disk and lever until the projection $c^{25}$ strikes the projection $c^{30}$ on the reversing-pawl, which is brought in contact with the pawl $c^{19}$ and throws said pawl out of engagement with the disk and throws the pawl $c^{18}$ into engagement with the disk. This occurs at the point where the lever has reached the limit of its downward stroke. As the lever starts to return the pawl $c^{18}$ will engage with the teeth and prevent the lever from again being moved downwardly until it has completed its upward stroke, when the position of the pawls will again be reversed by the contact of the lug $c^{24}$ with the projection $c^{30}$ on the reversing-pawl. When the lever $b$, however, has reached the limit of its downward stroke, the plain periphery of the quadrant-shaped disk $c^{11}$ has passed the projection $c^{14}$, so that if a pressure is exerted against the bar $c^9$ it may, by raising the lever $c^{13}$, be moved backwardly, so as to permit the locking-plate $c^6$ to yield sufficiently to allow the key-levers $c$ to be operated. The projection $c^5$ on each of the key-levers being slightly beveled where it contacts with the rib $c^8$ on the locking-plate, will, when a pressure is exerted on the outer end of the key, cause said locking-plate to yield backwardly to permit the inner end of the lever to rise, when the rib $c^8$ will again engage the projection $c^5$ and retain the lever in this position. Any key in any bank may thus be depressed, and in the event that the wrong key is operated the error may be rectified so long as the main operating-lever $b$ is held depressed, the depression of one key in any bank serving to release any other keys which have been depressed. Inasmuch as the projection $c^{14}$ will be raised as any key is depressed by reason of the movement of the locking-plates and the locking-bar $c^9$, the lever $b$ and the main shaft 1 cannot be operated in the opposite direction until these parts have settled to their normal positions, so that the partial depression of a key cannot be effected in any manner which would change the result. The key must be either clear up or clear down; otherwise the disk $c^{11}$ will be retained by the projection $c^{14}$ and the operation of registration cannot be completed, as will hereinafter more fully appear. As soon, however, as the proper keys have been depressed the spring $c^{17}$ will return the locking-plates and the locking-bar to their normal positions, so that the lever $c^{13}$ will drop down and release the disk $c^{11}$ and thus permit the main shaft and its operating-lever to return to their normal positions by the spring $b'$, providing the shaft has been moved far enough to reverse the position of the pawls $c^{18}$ and $c^{19}$, as before specified.

The proper movement of the indicating and registering devices is accomplished through the medium of graduated bars $d$, which are hung on the main shaft 1 by suitable arms $d'$ and are adapted, when released, to swing around said shaft and strike the key of the bank to which they relate that may have been operated. These graduated bars are each formed in the usual way with a series of steps corresponding to the respective keys, so that while the keys stand substantially in line the bars are permitted to move a number of steps corresponding to the number of the key operated. There is secured to the main shaft 1 a collar or sleeve $d^2$, having a lateral projection $d^3$, which is adapted to engage one of the arms $d'$ of each of the graduated bars $d$ and move said bar in one direction when the main shaft 1 is moved. (See Fig. 6.) Springs $d^4$ are preferably employed for moving the graduated bars $d$ toward the keys. The graduated bars $d$ are each held in normal position away from the key-levers by a projecting arm $d^5$, which extends backwardly from a swinging bar $d^6$, pivoted, through the agency of suitable arms $d^7$, to the rod 3, so as to stand across all the key-levers of one bank, so that whenever a key is operated the key-lever, by striking the pivoted bar $d^6$, will move the projection $d^5$ out of engagement with the graduated bar $d$ in the bank in which the key is operated, so that, providing the first movements have been correctly made, this graduated bar will be moved by the spring $d^4$ until it contacts with the key-lever which has been operated. Each of the graduated bars $d$ has a backwardly-extending arm $d^8$, to which there is pivoted one end of a link connection $d^9$, the opposite end of which is pivotally connected to a vertically-moving rack $d^{10}$. This rack $d^{10}$ engages with a pinion $d^{11}$ on an indicating-disk $d^{12}$, journaled on a suitable stud or arbor in a convenient portion of the frame, the construction being such that the rack and the indicating-wheel move positively with the graduated bar in either direction. The indicating-disk has numbers thereon from "0" to "9," which are adapted as the disk is moved to be displayed through a suitable opening $d^{13}$ in a plate $d^{14}$, which is arranged at the top of the casing.

Figure 15:
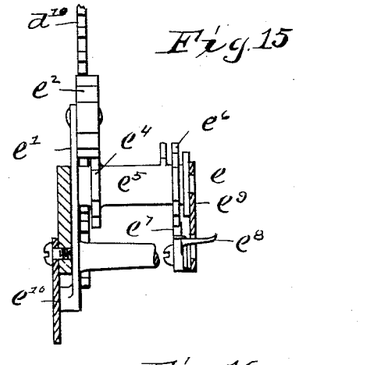
Figure 16:
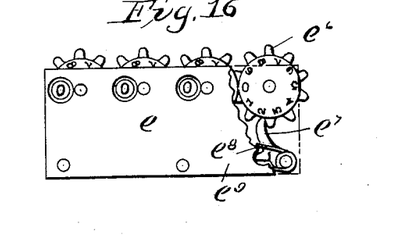

Arranged adjacent to each of the racks $d^{10}$ there is a counter $e$, which may be of any well-known construction, consisting of a series of counting-wheels each numbered from "0" to "9" and geared together, so that a complete rotation of one produces a movement of one unit of the other. This counter is adapted under certain conditions to be connected to the rack $d^{10}$ and move therewith by the following devices:

There is pivoted to a suitable part of the frame and adjacent to each of the racks $d^{10}$ a lever $e'$, which carries at its outer end a pinion $e^2$, which is normally out of engagement with the rack $d^{10}$, but is adapted by a movement of the lever $e'$ to be thrown into mesh therewith. There is on the lever $e'$, or, more properly speaking, on the stud $e^3$, about which this lever is pivoted, a pinion $e^4$, which meshes with the lever-pinion $e^2$. The lever-pinion $e^2$ is a broad-faced pinion, so that one end of it is always in engagement with the pinion $e^4$, but the pinion $e^4$ is never in engagement with the rack $d^{10}$. The pinion $e^4$ has a long sleeve or lug $e^5$, which carries at its other end a toothed wheel $e^6$, which forms the first of a series of counting-wheels in the counter $e$. (See Figs. 15 and 16.) A spring-actuated pawl $e^7$, engaging in the teeth of the counting-wheel $e^6$, prevents a movement of said wheel except in one direction. This pawl has a projection $e^8$, which extends through an opening in a plate $e^9$, forming a part of the counter-case, so that the pawl may be readily moved out of engagement with the said wheel when it is desired to return the counter to its normal or starting point. It will be seen by this construction that whenever the lever-pinion $e^2$ is thrown into mesh with the rack $d^{10}$ a gear connection is established between said rack and the counter $e$, so that the movement of the rack will be communicated to the counter.

Figures 8, 11A, 12:
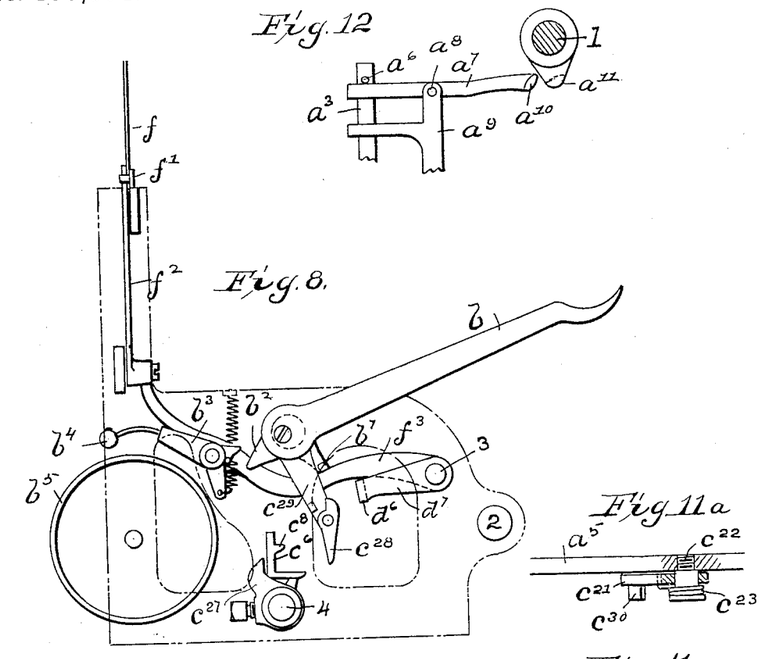

To provide for releasing any keys which have been depressed after their graduated bars have been actuated and returned to their normal positions, I employ on the shaft 4 a series of lugs $c^{26}$, one for each locking-plate $c^6$. This shaft 4 is supported so as to oscillate in the frame, and has at or near one end a projecting arm $c^{27}$, which is adapted to be engaged by a pawl $c^{28}$ on the end of an arm $c^{29}$, connected to the shaft 1 or the lever $b$. (See Fig. 8.) The pawl $c^{28}$, being pivoted on the end of the arm $c^{29}$, will press the end of the lug $c^{27}$ as the lever $b$ is depressed, the contact occurring just after the disk $c^{11}$ has passed the point $c^{14}$, so that the locking-bar is permitted to operate, the spring $c^{17}$ returning the parts immediately to their normal positions as soon as the keys have been released. As the lever $b$ is returned to its normal position the pivoted pawl $c^{28}$ will pass the lug or arm $c^{27}$ without operating the same.

The locking-bolt $a^3$ has at the top a projection $a^6$, which rests above a lever $a^7$, pivoted at $a^8$ to a suitable support $a^9$, secured to the frame. This lever $a^7$ extends forwardly and has on the end thereof a beveled lug $a^{10}$, which stands in the path of a projection $a^{11}$, secured to the main shaft 1, so that as said shaft is rotated by the depression of the operating-lever $b$ the projection $a^{11}$ will engage the lug $a^{10}$ on the under side, so that the pivoted lever $a^7$ will be moved away from the projection $a^6$ on the locking-bolt. As the main shaft turns back to its normal position, the projection $a^{11}$, engaging the beveled lug $a^{10}$ on the upper side, will cause the pivoted lever $a^7$ to contact with the projection $a^6$ and thus raise the bolt, so as to release the drawer. An alarm is caused to be sounded at the same time by a projection $b^2$, which engages with a spring-actuated bell-crank $b^3$, carrying at one end a striker $b^4$, adapted, when released, to contact with a gong $b^5$.

The operation of the lever-pinion $e^2$, which causes it to engage and disengage the rack $d^{10}$, is as follows: Each of the levers $e'$ is pivotally connected to a sliding bar or plate $e^{10}$, which is normally held by a spring $e^{11}$ in a position which will maintain the lever-gears $e^2$ out of engagement with the racks. Pivoted adjacent to this sliding plate $e^{10}$ is a lever $e^{12}$, one end of which engages a projection $e^{13}$ on the plate, the other end being provided with a spring-actuated pivoted pawl $e^{14}$. This pivoted pawl $e^{14}$ stands adjacent to the side of a sliding bar $e^{15}$, having at one edge and in line with the pawl notches $e^{16}$ and $e^{17}$. This sliding bar $e^{15}$ is connected by a link $e^{18}$ to an arm $b^6$ on the main shaft 1, so that whenever the shaft is oscillated this bar is caused to reciprocate. As the bar reciprocates one of the notches $e^{16}$, engaging with the pawl $e^{14}$, turns said pawl on its pivotal center until it stands substantially at right angles to the lever $e^{12}$. This causes an oscillation of the lever $e^{12}$, which in turn slides the plate $e^{10}$, thus forcing the respective pinions $e^2$ into contact with the racks $e^{10}$. The parts are held in this position as long as the sliding bar $e^{15}$ moves in one direction. When the motion of the bar $e^{15}$ is reversed, the pawl $e^{14}$ engages in the notch $e^{17}$ and the parts are returned to their normal positions.

The operation of the parts as thus described is as follows: To register an amount, the lever is drawn down, and through the agency of the disk $c^{11}$ and pivoted arm $c^{13}$ will unlock the locking-bar $c^9$, thus freeing the locking-plates $c^6$, so that one or more key-levers may be depressed. The levers in the banks are depressed corresponding to the amounts to be registered. The operation of a key in any bank unlocks the graduated bar for that bank, but the bars will be retained in position by the projections $d^3$ on the shaft 1. When the lever $b$ is released, the shaft 1 will be returned by the spring $b'$, so as to lock the keys and at the same time release the graduated bars, which will be turned until they contact with the key-levers which have been operated. The turning of the graduated bars will turn the indicating-wheels, so that the numbers corresponding to those on the keys depressed will stand opposite the openings in the upper part of the casing and the amount sought to be registered will be thus indicated. As the lever returns to its normal position the drawer or cash-receptacle will also be unlocked and opened. The parts remain in this position until another operation of the lever takes place, but as the keys cannot be operated until the lever is pulled down one registration is always complete before another is begun. As the lever is drawn down to unlock the keys for the purpose of another registration or to unlock the drawer or for any other purpose the first movement of the lever, transmitted through the arm $b^6$ and link $e^{18}$ to the sliding bar $e^{15}$, throws the sliding plate $e^{10}$, so as to cause the pinions $e^2$ to mesh with the racks $e^{10}$. As the main shaft continues to revolve the projections $d^3$ contact with the graduated bars, and thus return said bars to their normal positions, carrying with them the racks $d^{10}$ and the indicating-wheels. As these parts are returned a backward movement of the rack produces a corresponding movement of the counter attached to said rack. If the operating-lever is released, the parts will remain in this position with the registration of the previous sale completed, unless another registration is made while the operating-lever is still depressed. As soon as the lever $b$ starts to return to its normal position the first movement thereof throws the lever-pinions $e^2$ out of engagement with the racks and the counters remain at rest, while the racks may move to any position which would be predetermined by the position of any keys depressed in the bank to which it pertains.

It will be seen that by this construction the downward movement of the operating-lever and a corresponding movement of the main shaft completes any registration which may have been begun, then unlocks the keys to permit the beginning of another registration. As the lever is released the amount to be registered is indicated and all the keys locked in the positions which they may occupy whether depressed or not, the amount to be registered being thus indicated until the registration is complete and another registration begun by a subsequent downward movement of the lever.

Now the indicating-wheels are always moved back to zero whenever the operating-lever is depressed, and as they may at once assume a different position as soon as the lever is released—for instance, by the depressing of a key in a bank to which the indicating-wheel pertains—I preferably provide a small finger $f$, which is adapted to be moved over the opening $a^{13}$ while the position of the indicating-wheel is being changed. These fingers are attached to a sliding bar $f'$, which is connected to one end of a bell-crank lever $f^2$, the other end of which is connected to a pivoted lever $f^3$. This lever $f^3$ is preferably pivoted on the shaft 3 and is adapted to be engaged by an arm or projection $b^7$ on the main shaft 1, so that the moment said shaft begins to turn the lever $f^3$ will be depressed, thus moving the fingers $f$ in front of the openings $d^{13}$, until the operating-lever and the main shaft have returned to their normal positions, at which time the parts will be released and the fingers returned to their normal positions by a spring $f^4$, connected to the bell-crank lever $f^2$.

In machines of the type exhibited in the present drawings wherein the unit of registration is five there is but a single key in the first or units bank and the bar relating thereto always drops the same distance when released. If the unit is five, then the bar need not be graduated. To provide for simplifying the construction of the adding mechanism, I provide means by which every alternate key, or those representing odd multiples of five, are adapted to release the graduated bar in the units series, so that the unit will be indicated and registered by the proper mechanism. To accomplish this, each step of the graduated bar of the tens series is adapted to contact with either one of two keys—that is, one which represents an even multiple of five and one which represents an odd multiple—so that the graduated bar, as well as the registering and indicating devices of the tens-bank, will operate the same, no matter which key of a pair is depressed—that is, whether representing an odd or even multiple of five. Over this tens series or bank of keys there is an auxiliary bar $d^{15}$, which is connected to the arm $d^5$ of the units-bank. This bar $d^{15}$ is provided with a series of alternating projections and notches. The projections $d^{16}$ stand over the keys representing odd multiples of five and the notches $d^{17}$ over the keys representing even multiples of five. Whenever an odd multiple of five is indicated by the depression of a key, the bar $d^{15}$ will be raised by the contact between said bar and said key, so as to release the graduated bar in the five-bank. If one of the other keys—that is, representing even multiples of five—is operated, it will rise in the recess $d^{17}$, and the bar $d^{15}$ will not be operated. (See Figs. 3 and 4 for detail.) It will be seen by this construction that while the five-key is not operated "5" will be indicated and added on the units-bank whenever a key representing an odd multiple in the tens-bank is operated.

Figure 1:
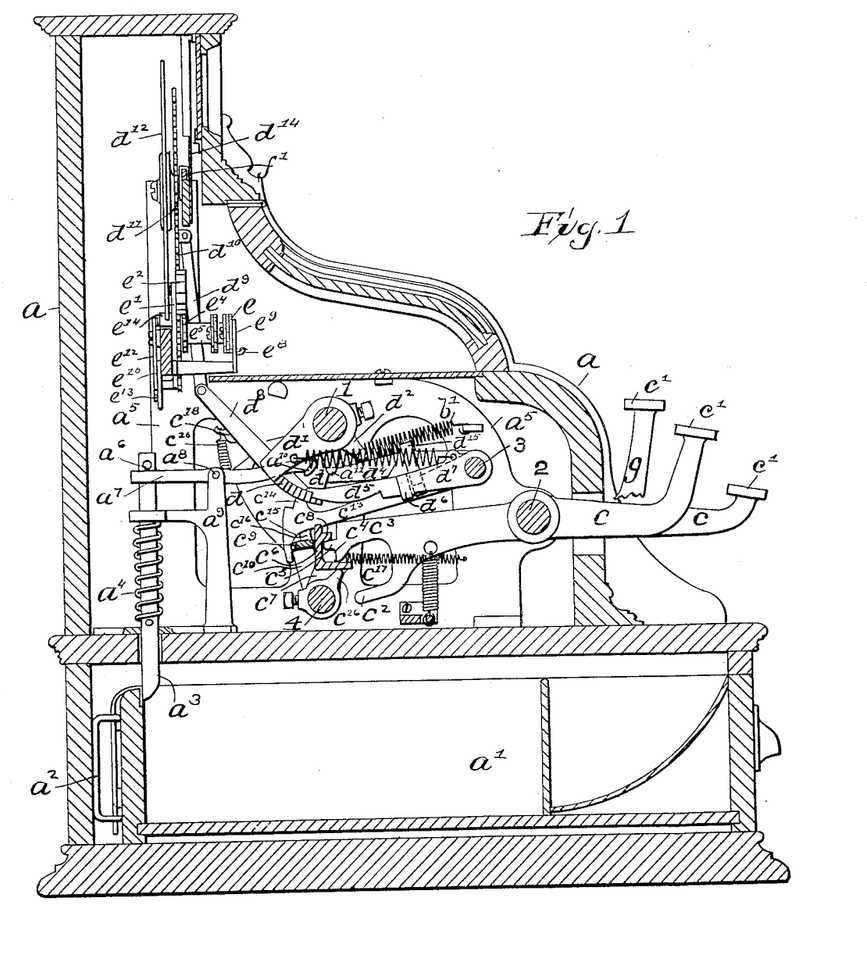
Figure 1 is a transverse sectional view through the casing, showing the keys and the mechanism connected thereto as well as the register-operating devices in side elevation.
Figures 6, 6A, 7, 8A:
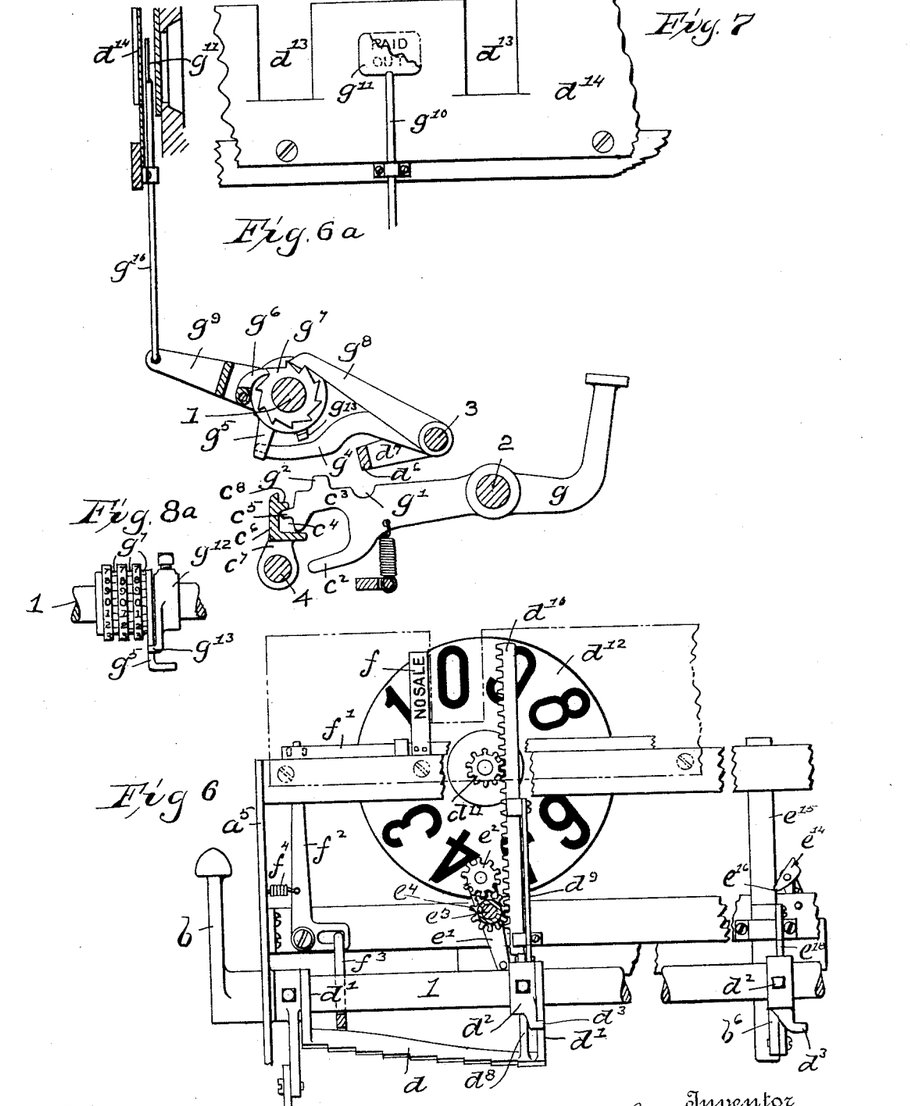

To provide for keeping account of special matter, such as "Cash paid out" and similar items, I employ special keys adapted to operate separate counters, as shown in Fig. 1 and in detail in Fig. $6^a$. $g$ represents such a key, which is journaled on the rod 2 and is adapted to be held by the locking-plate $c^6$ the same as the other keys. This key $g$, however, is notched out, as shown at $g'$, so that when operated it will not contact with and operate the bar $d^6$ to release the graduated bar in the bank in which it may be located. A projection $g^2$, however, on said key will contact with a pivoted arm $g^4$, which engages a movable pawl-frame $g^5$, journaled on the main shaft 1. This pawl-frame carries a pawl $g^6$, which engages with a ratchet-wheel $g^7$, forming one of a series of counting-wheels on the main shaft. This ratchet-wheel, as well as the counting-wheels, is held normally against movement by a pivoted pawl $g^8$, except when the frame $g^5$ is operated. An arm $g^9$ on the pawl-frame engages with a tablet-rod $g^{10}$, which carries at its upper end a shield $g^{11}$, which normally stands over the words "Paid out," or similar words, affixed to the plate $d^{14}$. Whenever a key is depressed, the pawl-frame will be released and will draw down, so that the pawl will be moved one notch around the ratchet-wheel, and at the same time the letters will be uncovered to indicate the character of the transaction. Adjacent to the pawl-frame on the shaft 1 there is secured a sleeve $g^{12}$, having a laterally-projecting finger $g^{13}$, which is adapted as the shaft is revolved to contact with the pawl-frame $g^5$ and carry it to its normal position, thus advancing the counting-wheels one notch and returning the shield, so as to stand over the letters or sign on the indicator. It will be understood that this movement which returns the parts to their normal positions and effects the counting takes place at the beginning of the subsequent transaction. As the lever must be drawn down before a key can be depressed the parts will not assume the indicating position until the lever returns to its normal position. Hence the sign will remain displayed and the key depressed until the beginning of a subsequent registration. This device, it will be understood, is simply a counting-indicator and registers only the number of times that such transactions as "Paid out," "Charged," or other items which do not enter into the cash take place, the accounting for these items being effected by tickets placed in the cash-drawer or by any other method.

Having thus described my invention, I claim—

1. The combination with a series of keys arranged in banks, a series of indicators corresponding thereto, and a series of independent registering devices for each bank, locking devices by which said keys are normally locked, and an operating-lever adapted by its movement to unlock said keys and register the amounts indicated thereby, and a connection from the tens-bank to the registering devices of the units-bank whereby certain keys of the tens-bank when depressed will cause the registering devices of the units-bank as well as the tens-bank to be operated when said lever is operated, substantially as specified.

2. The combination with a series of keys, and locking-plates for said keys, normally-inoperative registering devices adapted to be set in operation by a movement of one of said keys, a lever on a movable shaft, and intermediate mechanism between said shaft and locking-plates adapted to normally hold said keys in a locked position until the lever has moved to the limit of its stroke in one direction, and an operative connection from said shaft to said registering devices, substantially as specified.

3. The combination with a series of keys and an operating-lever, a main shaft connected to said lever, and normally-inactive registering devices controlled by said keys and adapted when released to be operated by said shaft, locking devices which normally hold said keys in a locked position, and intermediate mechanism between said lever and locking devices whereby the keys are unlocked by a movement of said lever in one direction, substantially as specified.

4. The combination with a series of normally-locked keys arranged in banks, and graduated bars, one for each bank, adapted when released to contact with any key of said bank which has been operated, means connected with the keys of each bank to unlock said graduated bar relating thereto, an operating-lever and intermediate connecting devices therefrom to the key-locking mechanism and said graduated bars whereby the keys are unlocked by one movement of said lever and the released bars returned to their normal positions by the opposite movement of said lever, and an auxiliary connection from the keys in one bank adapted to operate the releasing mechanism of the graduated bar of another bank whenever certain special keys in said bank are operated, substantially as specified.

5. The combination with a series of keys pivoted on a common shaft, a main operating-shaft having journaled thereon normally-locked graduated bars adapted to be released and to contact with either of said keys when the same are operated, locking-plates for said keys, and means connected with said main shaft for holding said plates in a locked position until the shaft is operated, and intermediate connecting devices for locking said shaft against its return stroke by the partial depression of any key, substantially as specified.

6. The combination with a series of keys pivoted on a common shaft and of substantially the same length, a series of locking-plates to hold said keys normally locked, a main operating-shaft and registering devices connected therewith, graduated bars forming part of said registering devices pivoted on said main shaft, retaining devices for said graduated bars adapted to be operated by any of the keys in the series, and means for retaining said locking-plates in their normal positions until the main shaft has been operated, substantially as specified.

7. The combination with a series of keys, a graduated bar adjacent to said keys, a retaining device for said graduated bar adapted to be released by the operation of a key, a vertically-movable rack, and a connection from said graduated bar to said rack, a laterally-movable pinion to engage said rack, and means for throwing said pinion into and out of engagement with said rack to cause said pinion to mesh with said rack when moved in one direction and to be freed therefrom when moved in the other direction, substantially as specified.

8. The combination of a series of keys, a pivoted graduated bar, a longitudinally-movable rack connected to said graduated bar, an indicating-wheel having a pinion meshing with said rack, a laterally-movable pinion adapted to be moved into and out of engagement with said rack, and a counting or registering device, having a gear connection with said movable pinion, substantially as specified.

9. The combination with the vertically-movable rack, an indicating-wheel having a pinion geared to said rack, a graduated bar pivoted on a main shaft so as to contact with any one of a series of keys which may be operated, a pivoted connection from said graduated bar to said rack, and a locking device operated by said shaft to normally lock said keys, a registering and counting device geared to a movable pinion adapted to engage and disengage said rack, and means for engaging and disengaging said pinion by a movement of said shaft, substantially as specified.

10. The combination with a series of keys, a main shaft, a graduated bar pivoted on said shaft, a retaining device for said graduated bar, and means connected with said main shaft for returning said graduated bar to its normal position, a locking device for said keys also adapted to be operated by a movement of said shaft, a rack pivoted to said graduated bar, an indicating-wheel geared to said rack, a registering device geared to a movable pinion, and means for causing said pinion to engage and disengage said rack by a movement of said shaft, substantially as specified.

11. The combination with a rack and indicating-wheel geared thereto, of a registering device geared to a movable pinion, a sliding plate connected to said pinion to cause the same to engage and disengage said rack when said plate is moved, a longitudinally-moving bar having engaging notches therein, a pawl to engage in said notches, and a lever supporting said pawl, said lever being connected to said movable plate whereby a movement of said bar will produce a movement of said sliding plate to cause the pinion to engage said rack, substantially as specified.

12. The combination with the movable rack, a pivoted lever having a pinion adjacent to said rack, a movable plate pivoted to said lever, a pivoted pawl-lever engaging said plate having a pawl at one end thereof, and a bar having notches to engage said pawl whereby said plate is caused to move in opposite directions by the first movement of said bar in opposite directions, substantially as specified.

13. The combination with a series of keys and their indicating and registering devices, locking-plates for said keys, special keys arranged in the same bank with said main keys and held by the same locking-plate, said special keys being adapted to release independent counting devices, and means for operating said counting devices and returning them to their normal positions by the same operation which produces the movement of the main indicating and registering devices, substantially as specified.

14. The combination with a series of keys, and locking-plates for said keys, a lever on a movable shaft, and an intermediate connection between said shaft and locking-plates adapted to release said locking-plates when the lever has reached the limit of its movement in one direction, and intermediate mechanism between said keys and lever to lock said lever against return movement whenever either of said keys is partially depressed, substantially as specified.

15. In a cash-register, the combination with a series of normally-locked keys and normally-inactive registering devices, a main operating-shaft adapted through intermediate connections to unlock said keys when moved in one direction and to operate the registering devices released by said keys when moved in the opposite direction, and locking devices operated by said keys to lock said shaft against its return movement by the partial depression of any key and to unlock said shaft when the key has been completely depressed, substantially as specified.

16. The combination with a series of keys, and locking-plates for said keys, a main operating-shaft having a limited movement in one direction, and a spring for returning the shaft to its normal position, and intermediate operating mechanism between said shaft and locking-plates to release said locking-plates when the shaft has reached the limit of its stroke in one direction, and locking devices connected with said keys to lock said shaft against its return stroke when one of said keys is partially depressed and to unlock said shaft by the complete depression of said key, substantially as specified.

17. The combination with a series of keys, graduated bars arranged adjacent to said keys and adapted when released to contact with said keys to determine the movement of said bars, a vertically-movable rack pivotally connected to each of said bars so as to move therewith, an indicating-wheel having numbers corresponding to the steps on said graduated bar whereby the position of said graduated bar is indicated by said indicating-wheel, and a registering device adapted to be operated by said rack in one direction, substantially as specified.

18. The combination with a series of keys and a graduated bar adjacent to said keys, a retaining device for said graduated bar adapted to be released by the operation of either of said keys, a vertically-movable rack, and a connection from said graduated bar to said rack, an indicating-wheel having a pinion geared to said rack, and a registering device normally disconnected from said rack but adapted to be connected therewith and moved thereby when said rack is returned to its normal position, substantially as specified.

In testimony whereof I have hereunto set my hand this 17th day of February, A. D. 1896.

JOHN PFEIFER.

Witnesses:
CHAS. I. WELCH,
OLIVER H. MILLER.